(12) United States Patent
Grigoriev et al.

(10) Patent No.: US 8,293,073 B2
(45) Date of Patent: Oct. 23, 2012

(54) MODIFIED VINYLAMINE/VINYLFORMAMIDE POLYMERS FOR USE AS CREPING ADHESIVES

(75) Inventors: Vladimir A. Grigoriev, Chicago, IL (US); Gary S. Furman, St. Charles, IL (US); Mingli Wei, Naperville, IL (US); Winston Su, Naperville, IL (US); Christopher D. Kaley, Aurora, IL (US)

(73) Assignee: Nalco Company, Naperville, IL (US)

( * ) Notice: Subject to any disclaimer, the term of this patent is extended or adjusted under 35 U.S.C. 154(b) by 346 days.

(21) Appl. No.: 11/172,079

(22) Filed: Jun. 30, 2005

(65) Prior Publication Data

US 2007/0000631 A1 Jan. 4, 2007

(51) Int. Cl.
*B31F 1/12* (2006.01)

(52) U.S. Cl. ............. 162/112; 162/168.2; 156/183; 264/283

(58) Field of Classification Search .......... 162/111–113, 162/168.1–168.2; 264/282–283; 156/183
See application file for complete search history.

(56) References Cited

U.S. PATENT DOCUMENTS

| | | | |
|---|---|---|---|
| 3,640,841 A * | 2/1972 | Winslow et al. ............ | 162/164.6 |
| 4,880,497 A * | 11/1989 | Pfohl et al. ..................... | 162/135 |
| 5,126,395 A * | 6/1992 | End et al. ...................... | 524/801 |
| 5,374,334 A | 12/1994 | Sommese et al. | |
| 5,507,194 A * | 4/1996 | Scavuzzo et al. ........... | 73/864.63 |
| 5,700,893 A * | 12/1997 | Kuo et al. ................... | 526/307.1 |
| 5,702,613 A * | 12/1997 | Sommese et al. ............. | 210/708 |
| 5,994,449 A | 11/1999 | Maslanka | |
| 6,207,011 B1 | 3/2001 | Luu et al. | |
| 6,602,955 B2 * | 8/2003 | Soerens et al. ................ | 525/91 |
| 6,663,942 B1 | 12/2003 | Luu et al. | |
| 6,689,250 B1 | 2/2004 | Luu et al. | |
| 2002/0096288 A1 * | 7/2002 | Allen .......................... | 162/168.1 |
| 2005/0006040 A1 * | 1/2005 | Boettcher et al. ............ | 162/111 |
| 2005/0028954 A1 * | 2/2005 | Neal et al. .................... | 162/111 |
| 2005/0245669 A1 * | 11/2005 | Clungeon et al. ............ | 524/515 |
| 2006/0142432 A1 * | 6/2006 | Harrington et al. ............ | 524/13 |
| 2007/0000631 A1 * | 1/2007 | Grigoriev et al. ............. | 162/111 |
| 2007/0151684 A1 * | 7/2007 | Grigoriev et al. ............. | 162/111 |
| 2009/0043051 A1 * | 2/2009 | Gu et al. ........................ | 525/386 |
| 2009/0145565 A1 * | 6/2009 | Esser et al. .................... | 162/111 |

FOREIGN PATENT DOCUMENTS

EP 541232 A1 * 5/1993
WO WO 2007005577 A2 * 1/2007

* cited by examiner

*Primary Examiner* — Jose A Fortuna
(74) *Attorney, Agent, or Firm* — Benjamin E. Carlsen; Andrew D. Sorenson

(57) ABSTRACT

This invention is method of creping a paper web comprising a) applying to a rotating creping cylinder an adhesive composition having a pH of about 6.5 to about 8 and comprising one or more vinylamine/N-vinyl formamide polymers composed of about 10 to about 99 mole percent vinylamine monomer and about 90 to about 1 mole percent N-vinylformamide monomer; b) pressing the paper web against the creping cylinder to effect adhesion of the paper web to the creping cylinder; and c) dislodging the paper web from the creping cylinder with a doctor blade.

17 Claims, No Drawings

MODIFIED VINYLAMINE/VINYLFORMAMIDE POLYMERS FOR USE AS CREPING ADHESIVES

TECHNICAL FIELD

This invention relates to a method of creping paper products in which a paper web is adhered to a creping cylinder using poly(vinylamine/vinylformamide) compositions having a pH of about 6.5 to about 8.

BACKGROUND OF THE INVENTION

The desired properties of tissue, including softness, bulk, stretch and absorbency, are typically achieved by the means of a steam-heated Yankee dryer cylinder and a doctor blade. A wet fiber web is largely dewatered at the pressure roll nip. At this point, the sheet is transferred to the Yankee surface and has a consistency of about 35-80%. The sheet is further dried on the hot Yankee cylinder to a typical consistency of 90-98% and removed with a doctor blade. The mechanical action of the blade results in a disruption of the fiber-fiber bonds and a formation of a microfold structure within the sheet. This process is referred to as creping.

In order to develop the crepe, the paper web has to adhere to the surface of the Yankee dryer. The adhesion is provided by applying an adhesive to the dryer. Most common Yankee adhesives are synthetic polymers such as polyaminoamides, polyamides, polyamines, polyvinyl alcohols, polyvinyl acetates, polyacrylamides and polyethers. Various low molecular weight compounds are used to modify the Yankee coating properties.

A superior Yankee coating should form a film that provides good adhesion for efficient creping, and is also uniform, durable and soft. Uniformity of the coating is critical not only for consistent creping that affects the quality of the produced sheet, but also for even coverage of the Yankee surface to prevent premature wear of the cylinder and the blade. Durability is a characteristic of how stable the coating is on the Yankee surface, particularly at the pressure roll nip. If the coating is easily washed off, it does not protect the Yankee cylinder and leads to excessive creping blade wear. A hard coating causes blade chatter, which results in blade wear and non-uniform creping. A soft, but durable coating is preferred.

Polyaminoamides crosslinked with epichlorohydrin (PAE) are the most widely used adhesives in commercial practice by a wide margin. Depending on the grade and creping conditions, adhesion, durability and softness of the coating can be adjusted to an appropriate level by using combinations of PAE resins having various molecular weight and/or modifiers such as release oils, surfactants, humectants, phosphates, etc. Yet, the applicability of PAE resins is not universal and they do not always work for all tissue grades and conditions. The most common problem that is faced with PAE adhesives is their tendency to build up on the Yankee dryer, sometimes referred to as "hard" coating. This results in blade chatter causing picks or holes in the sheet and resulting in sheet breaks and machine downtime. Moreover, even though the amounts of epi and epi by-products are very low in the modern PAE adhesives, the industry would prefer to use non-epi adhesives if an alternative existed. However, other non-epi alternatives including polyvinyl alcohols, polyvinyl acetates, polyacrylamides and polyethers, also have deficiencies regarding the coating properties they provide in that there is not an optimum combination of coating durability, softness, adhesion and uniformity. Accordingly, there is an ongoing need for improved creping adhesive compositions.

SUMMARY OF THE INVENTION

This invention is a method of creping a paper web comprising
a) applying to a rotating creping cylinder an adhesive composition having a pH of about 6.5 to about 8 and comprising one or more vinylamine/N-vinyl formamide polymers composed of about 10 to about 99 mole percent vinylamine monomer and about 90 to about 1 mole percent N-vinylformamide monomer;
b) pressing the paper web against the creping cylinder to effect adhesion of the paper web to the creping cylinder; and
c) dislodging the paper web from the creping cylinder with a doctor blade.

DETAILED DESCRIPTION OF THE INVENTION

"Tissue paper web, paper web, web, paper sheet, sheet and paper product" all refer to sheets of paper made by a process comprising the steps of forming an aqueous papermaking furnish; depositing this furnish onto a foraminous surface, such as a Fourdrinier wire, and removing the water from the furnish either by gravity, by vacuum assisted drainage or by evaporative means (eg. TAD). In the final step of the process, the desirable textural characteristics are imparted to the paper by a creping process comprising: a) applying an adhesive composition to the surface of a creping cylinder; b) adhering a cellulosic web to the creping cylinder and; c) dislodging the adhered web from the creping cylinder with a doctor blade.

The tissue web can be comprised of various types of natural and synthetic fibers including wood pulps of chemical and mechanical types, vegetable fibers, recycled fibers and synthetic fibers such as polypropylene. The tissue web can also be comprised of particulate fillers, such as kaolin clay, titanium dioxide, and/or calcium carbonate.

All percentages, ratios and proportions herein are by weight unless otherwise specified.

Vinylamine/N-vinyl formamide polymers suitable for use in the method of this invention are prepared by polymerization of N-vinylformamide under free radical forming conditions followed by acid or base hydrolysis of a portion of the amide groups to amine groups. By controlling the stoichiometry of the hydrolyzing agent, it is possible to prepare vinylamine/N-vinyl formamide polymers containing the desired vinylamine/vinylformamide ratio. The preparation of vinylamine/N-vinyl formamide polymers is described in U.S. Pat. No. 5,374,334 and references cited therein. The preparation of stable dispersions of vinylamine/N-vinyl formamide polymers in aqueous salt solution is described in U.S. Pat. Nos. 6,426,383 and 6,894,110. Vinylamine/N-vinylformamide polymers are also commercially available from BASF, Mount Olive, N.J. under the tradename Lupamin.

The pH of the vinylamine/N-vinyl formamide polymers can be adjusted to the desired range of 6.5-8 by addition of acid. Representative acids include sulfuric, hydrochloric, phosphoric, formic, acetic, and the like. In an embodiment, the acid is selected from sulfuric acid and formic acid.

In an embodiment, the vinylamine/N-vinyl formamide polymers have a weight average molecular weight of about 100,000 to about 500,000 Daltons.

In an embodiment, the vinylamine/N-vinyl formamide polymers are composed of about 20 to about 80 mole percent vinylamine monomer and about 80 to about 20 mole percent N-vinylformamide monomer.

In an embodiment, the vinylamine/N-vinyl formamide polymer composition has a pH of about 7 to about 7.5.

In an embodiment, the vinylamine/N-vinyl formamide polymers have a weight average molecular weight of about 300,000 to about 400,000 Daltons.

In an embodiment, this invention is a polymer composition having a pH of about 6.5 to about 8 comprising one or more vinylamine/N-vinyl formamide polymers composed of about 10 to about 99 mole percent vinylamine monomer and about 90 to about 1 mole percent N-vinylformamide monomer wherein the vinylamine/N-vinyl formamide polymers are reacted with about 1 to about 10 percent, based on polymer actives, of one or more crosslinkers wherein the crosslinkers contain at least one epoxide group and no halogens.

Representative crosslinkers according to this embodiment include polyethyleneglycol diglycidyl ether, trimethylolpropane triglycidyl ether, glycerol propoxylate triglycidyl ether, glycerol triglycidyl ether, N,N-diglcylidylaniline, tris(2,3-epoxypropyl)isocyanurate, and the like.

Reaction with crosslinkers is typically accomplished by heating an aqueous solution of the vinylamine/N-vinyl formamide polymers and the desired amount of cross-linker at a temperature of about 20° C. to about 100° C.

In an embodiment, the vinylamine/N-vinyl formamide polymers reacted with the crosslinkers are composed of about 30 to about 99 mole percent vinylamine monomer and about 70 to about 1 mole percent N-vinylformamide monomer.

In an embodiment, the vinylamine/N-vinyl formamide polymers reacted with the crosslinkers are composed of about 85 to about 95 mole percent vinylamine monomer and about 15 to about 5 mole percent N-vinylformamide monomer.

In an embodiment, the vinylamine/N-vinyl formamide polymers reacted with the crosslinkers have a weight average molecular weight of about 10,000 to about 100,000 Daltons.

In an embodiment, the vinylamine/N-vinyl formamide polymers reacted with the crosslinkers have a molecular weight of about 30,000 to about 60,000 Daltons.

In an embodiment, the crosslinkers are selected from polyethyleneglycol diglycidyl ether (PEGDGE) and trimethylolpropane triglycidyl ether (TMPTE).

In an embodiment, one or more vinylamine/N-vinyl formamide polymers according to this invention and one or more polymers selected from the group consisting of polyaminoamides, polyalkylenepolyamines, poly(vinyl alcohol/vinylacetate), polyethylenimines and polyvinylamine copolymers in a ratio of about 5/95 to about 95/5 by weight are reacted with about 1 to about 10 percent, based on polymer actives, of one or more crosslinkers as described herein.

Polyaminoamides are generally made from the condensation polymerization of one or more organic dicarboxylic acid derivatives and one or more polyalkylene polyamines under conditions suitable for forming long-chain polyamides, preferably at temperatures higher than about 130° C. for several hours with removal of water or alcohol byproducts. The resulting polyaminoamide typically has a weight average molecular weight of about 500 to about 500,000 Daltons and a polymer Brookfield viscosity higher than about 100 cps for a 50% solution at 25° C. Water is added at end of the polymerization to make an aqueous polymer solution.

Generally, a sufficient amount of organic acid derivative to react with substantially all of the primary amino groups but insufficient to react to any significant degree with the secondary amino groups of the polyalkylene polyamine is used. The organic dicarboxylic acid derivative/polyalkylene polyamine molar ratio is preferably between about 0.9/1.0 to about 1.0/0.9.

"Organic dicarboxylic acid derivatives" includes aliphatic and aromatic dicarboxylic acids and their corresponding acid chlorides, anhydrides and esters, and mixtures thereof. Esters are preferably $C_1$-$C_3$ aliphatic esters. The organic dicarboxylic acid derivatives are selected such that the resulting polyaminoamide is water soluble or water dispersible.

Representative organic dicarboxylic acids and their derivatives include maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl, ethyl adipate, dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl) ether, succinyl chloride, glutaryl dichloride, adipoyl chloride, sebacoyl chloride, phthaloyl chloride, isophthaloyl chloride, terephthaloyl chloride, naphthalenedicarboxylate, maleic anhydride, succinic anhydride, glutaric anhydride, phthalic anhydride, 1,8-naphthaic anhydride, and the like. DBE-2 dibasic ester, adipic acid, dimethyl glutarate and dimethyl adipate are preferred.

"Polyalkylene polyamines" means those organic compounds having two primary amine (—$NH_2$) groups and at least one secondary amine group where the amino nitrogen atoms are linked together by alkylene groups, provided no two nitrogen atoms are attached to the same carbon atoms. Representative polyalkylene polyamines include diethylenetriamine (DETA), triethylenetetraamine (TETA), tetraethylenepentaamine (TEPA), dipropylenetriamine, and the like.

Poly(vinyl alcohol/vinyl acetate) may be prepared by radical polymerization of vinyl acetate monomers as described in EP 0942008 and references cited therein followed be either acid or base hydrolysis as described in "Polyvinyl alcohol", ed. By C. A. Finch, John Wiley & Sons, New York, 1973, pp. 91-120. Poly(vinyl alcohol/vinyl acetate) is also commercially available, for example from Celanese Corp., Dallas, Tex. under the tradename Celvol and from E.I. DuPont de Nemours & Company, Wilmington, Del. under the tradename Elvanol.

In an embodiment, the poly(vinyl alcohol/vinyl acetate) has a weight average molecular weight of about 13,000 to about 186,000 daltons and is composed of about 87-99.5 mole percent of vinyl alcohol units and about 13 to about 0.5 mole percent of vinyl acetate units.

In an embodiment, the poly(vinyl alcohol/vinyl acetate) has a weight average molecular weight of about 30,000 to about 60,000 daltons and is composed of about 87-89 mole percent of vinyl alcohol units and about 13 to about 11 mole percent of vinyl acetate units.

Polyvinylamine may be prepared by hydrolysis of poly(N-vinyl formamide) as described in U.S. Pat. No. 5,374,334 and references cited therein. Polyvinylamines useful for the method and compositions of this invention typically have a molecular weight of about 5,000 to about 500,000 Daltons. In an embodiment, the polyvinylamine has a weight average molecular weight of about 10,000 to about 100,000 Daltons.

Polyethyleneimines may be prepared by polymerization of ethyleneimine as described in U.S. Pat. Nos. 2,182,306 and 3,251,778. Polyethyleneimines are also commercially available, for example from BASF, Mount Olive, N.J. under the tradename Lupasol. Polyethyleneimines typically useful for the method and compositions of this invention have a weight average molecular weight of about 1,000 to about 1,000,000.

In an embodiment, the vinylamine/N-vinyl formamide polymers and/or cross-linked vinylamine/N-vinyl formamide polymers are modified by reaction with one or more halogenated organic acids of formula X—R—CO$_2$M where X is F, Cl, Br or I, R is alkyl or alkylaryl and M is H or an alkaline or alkaline earth metal or ammonium counterion including lithium, sodium, potassium, calcium, ammonium, and the like. Alkyl groups may be straight or branched and typically contain 1 to about 6 carbon atoms. Aryl groups are typically phenyl, optionally substituted with one or more halogen, alkyl, alkoxy or hydroxyl groups.

Representative halogenated organic acids include chloroacetic acid, 4-(chloromethyl)benzoic acid, 2-chloropropionic acid, 3-chloropropionic acid, bromoacetic acid, 2-bromobutyric acid, 3-bromobutyric acid, 4-bromobutyric acid, α-bromoisobutyric acid, and the like and their salts.

In an embodiment, the halogenated acid is chloroacetic acid or a salt thereof.

In an embodiment, the adhesive composition of this invention further comprises one or more water-soluble polyols.

As used herein, "polyols" refers to simple water-soluble polyols composed of alkylene groups and up to about six hydroxyl groups in which the alkylene groups are optionally interrupted by one or more O or NH groups. Representative water-soluble polyols include glycerol, ethylene glycol, 1,4-butanediol, diethanolamine, triethanolamine, sorbitol, diethylene glycol, triethylene glycol, propylene glycol, dipropylene glycol, polyethylene glycol, and the like.

In an embodiment, the polylols are selected from glycerol, ethylene glycol, sorbitol, diethylene glycol, propylene glycol, polyethylene glycol and diethanolamine.

In an embodiment, the polyol is glycerol.

The amount of water soluble polyols in relation to the vinylamine/N-vinyl formamide polymers on a dry polymer basis typically range from about 5 to 95 percent by weight. In an embodiment it is desirable to use between about 10-75 percent by weight of the water soluble polyol. It is to be understood that not all of the water soluble polyols produce similar results. In certain instances, depending upon the temperature employed, the particular the vinylamine/N-vinyl formamide polymers used and other variables, routine experimentation will be necessary to determine the optimum water soluble polyol to be used, as well as the particular amount to be employed in conjunction with the vinylamine/N-vinyl formamide polymers.

The adhesive compositions of the present invention are typically applied to the surface of a creping cylinder as a dilute aqueous solution. In an embodiment, the aqueous solution includes from about 0.01 to about 10.0 weight percent of the polymers of the invention. In another embodiment, the polymers of the invention are included in the aqueous solution in a concentration of from about 0.05 to about 5.0 weight percent. In another embodiment, the polymers of the invention are included in the aqueous solution in a concentration of from about 0.1 to about 1.0 weight percent. Those skilled in the art of creping adhesives will appreciate that the reason for such a larger percentage of water in the admixture is in part based on the need to only deposit a very thin layer of adhesive on the creping cylinder, which, in one embodiment, is most easily accomplished with a spray boom.

The spraying applications described above may be further improved by a variety of means, for example by using spraybooms designed for double or triple coverage, by oscillating the sprayboom and by recirculation of the diluted release aid composition from the outlet of the sprayboom to improve mixing and reduce the possibility of separation.

In an embodiment, a release aid that is also in aqueous form is applied to the Yankee dryer along with the polymer adhesive. The release aid provides lubrication between the Yankee dryer surface and the doctor blade used to crepe the tissue paper from the Yankee dryer. The release aid also allows the tissue paper to release from the adhesive during the creping process. Representative release aids include release oils composed of naphthenic, paraffinic, vegetable, mineral or synthetic oil and emulsifying surfactants. In order to form stable aqueous dispersions the release aid is typically formulated with one or more surfactants such as fatty acids, alkoxylated alcohols, alkoxylated fatty acids, and the like. The release aid may be applied to the creping cylinder before or after the adhesive composition, or may be formulated with the adhesive for application to the creping cylinder.

The adhesive compositions of this invention may also be used in combination with functional additives used in the art to improve the softness of the tissue or towel. Representative functional additives include organic quaternary salts having fatty chains of about 12 to about 22 carbon atoms including dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, and the like. Additional suitable functional additives include polysiloxanes, quaternary silicones, organoreactive polysiloxanes, amino-functional polydimethylsiloxanes, and the like.

In an embodiment, the functional additives are formulated with the adhesive composition of this invention for application to the creping cylinder.

In an embodiment, the functional additives are selected from dialkylimidazolinium quaternary salts and quaternary silicones.

The foregoing may be better understood by reference to the following examples, which are resented for purposes of illustration and are not intended to limit the scope of the invention.

Representative polymers used for preparing the adhesive compositions of this invention are shown in Table 1.

TABLE 1

Description of the commercial polymers used in this invention.

| Backbone polymer | Description |
|---|---|
| Polymer A[1] | Poly(vinylamine/N-vinylformamide), ~95/5 mol. ratio, MW ~340 kDa |
| Polymer B[2] | Poly(vinylamine/N-vinylformamide), ~30/70 mol. ratio, MW ~340 kDa |
| Polymer C[3] | Poly(vinylamine/N-vinylformamide), ~95/5 mol. ratio, MW ~45 kDa |
| Polymer D[4] | Poly(adipic acid/diethylenetriamine), ~1/1 mol. ratio, MW ~10–12 kDa |
| Polymer E[5] | Poly(vinyl alcohol/vinyl acetate), ~88/12 mol. ratio, MW 31–50 kDa |

TABLE 1-continued

Description of the commercial polymers used in this invention.

| Backbone polymer | Description |
|---|---|
| Polymer F[6] | Polyaminoamide-epichlorohydrin (PAE) resin (Polymer D cross-linked with epichlorohydrin) |

[1]Lupamin 9095, available from BASF, Mount Olive, NJ.
[2]Lupamin 9030, available from BASF, Mount Olive, NJ.
[3]Lupamin 4595, available from BASF, Mount Olive, NJ.
[4]Available from Nalco Company, Naperville, IL.
[5]Celvol 21205, available from Celanese, Dallas, TX.
[6]Nalco 03PV094, available from Nalco Company, Naperville, IL.

EXAMPLE 1

Preparation of a Solution of poly(vinylamine/N-vinylformamide Reacted with PEGDGE Poly(vinylamine/N-vinylformamide (Lupamin 9095, 80 g) and deionized water (112 g) are mixed well in a 250-ml reactor and the mixture is heated to 80° C. with stirring under nitrogen purge. Poly(ethylene glycol) diglycidyl ether (Mn=350, 0.13 g) is added into the reactor and the solution is heated for another 2 hours at 80° C. The solution is cooled to 25° C. and collected. The solution pH is 9.0. The pH is then adjusted with sulfuric acid to the desired value.

EXAMPLE 2

Preparation of a Solution of poly(vinylamine/N-vinylformamide Reacted with TMPTE Poly(vinylamine/N-vinylformamide (Lupamin 4595, 240.0 g) and deionized water (575 g) are mixed in 1500 ml reactor and the mixture is heated to 80° C. with stirring under nitrogen purge. Trimethylolpropane triglycidyl ether (TMPTE, 9.9 g) is slowly added over two hours and the solution is further heated for another 2.0 hours 80° C. The solution is cooled to 25° C. The solution pH is 9.1. The pH is then adjusted with sulfuric acid to the desired value.

EXAMPLE 3

Preparation of a Solution of poly(vinylamine/N-vinylformamide Reacted with TMPTE and Modified with Sodium Chloroacetate To a portion of the poly(vinylamine/N-vinylformamide reacted with TMPTE (160 g), prepared in Example 2, is added a solution of sodium chloroacetate (2.67 g) in 15.1 g water (15.1 g) and the mixture is heated at 80° C. for 2 hours. The solution is cooled to 25° C., to provide a solution of the title compound having a pH of 7.5.

EXAMPLE 4

Preparation of a Solution of polyvinyl alcohol/poly(vinylamine/N-vinylformamide) Reacted with TMPTE Polyvinyl alcohol (Celvol 21205, 214.3 g), Lupamin 4595 (120.0 g), and deionized water (165.0 g) are mixed in a 1000-ml reactor and the mixture is heated to 80° C. with stirring under nitrogen purge. TMPTE (3.5 g) is slowly added over one hour and the solution is further heated for another 2.0 hours 80° C. The solution is cooled to 25° C. to provide the title composition having a pH of 7.8.

EXAMPLE 5

Preparation of a Solution of polyvinyl alcohol/poly(vinylamine/N-vinylformamide) Reacted with TMPTE and Modified with Sodium Chloroacetate To a portion of the polyvinyl alcohol/poly(vinylamine/N-vinylformamide) crosslinked with TMPTE (140 g) prepared in Example 4 is added a solution of sodium chloroacetate (1.0 g) in water and the mixture is heated at 80° C. for 2 hours. The solution is cooled to 25° C. to provide the title composition having a pH of 7.1.

EXAMPLE 6

Effect of pH

The effect of pH on the adhesion provided by the compositions of this invention is measured by means of a wet tack peel adhesion test. This test measures the force required to peel a cotton strip from a heated metal plate. First a film of the adhesive composition is applied to the metal panel by means of a #40 coating rod. The adhesive is applied to the panel at 15% actives. The metal plate is heated to 100° C. and at this point a wet cotton strip is pressed into the film by means of a 1.9 kg cylindrical roller. After the strip is applied, the metal plate is placed in a 105° C. oven for 15 minutes to dry the strip. The metal plate is then clamped in a tensile testing apparatus. One end of the cotton cloth is clamped in the pneumatic grip of the tester and the cloth is peeled from the panel at an angle of 180° and at a constant speed. During the peeling the metal plate is controlled to a temperature of 100° C. The effect of pH on adhesion for representative polymers of this invention is shown in Table 2. The pH of the samples is adjusted using formic acid.

TABLE 2

Improvement in adhesion by adjusting the pH.

| | Peel-force (g/in) | |
|---|---|---|
| pH | Polymer A | Polymer B |
| 6.0 | 249 | 396 |
| 7.0 | — | 475 |

TABLE 2-continued

Improvement in adhesion by adjusting the pH.

| | Peel-force (g/in) | |
|---|---|---|
| pH | Polymer A | Polymer B |
| 7.1 | 513 | — |
| 7.5 | 715 | 466 |
| 8.4 | — | 372 |
| 8.8 | 272 | — |
| 9.4 | — | 341 |

As shown in Table 2, the peel force varies widely within the range tested. The preferred pH range is about 7-7.5.

EXAMPLE 7

Effect of Polyols on Adhesion

In this example, varying amounts of glycerol are added to representative polymer compositions of this invention and the effect on adhesion is evaluated using the wet tack peel adhesion test described above. As shown in Table 3, the adhesion of representative polymer compositions is enhanced by adding glycerol.

TABLE 3

Improvement in adhesion by adding glycerol.

| Glycerol concentration (% polymer actives) | Peel-force (g/in) | | |
|---|---|---|---|
| | Polymer A | Polymer B | Polymer C |
| 0 | 416 | 475 | 141 |
| 4 | 428 | — | — |
| 8 | 491 | — | 133 |
| 10 | — | 610 | — |
| 17 | 538 | — | 179 |
| 25 | — | 538 | — |
| 33 | 571 | — | 317 |
| 40 | — | 135 | — |
| 67 | 466 | — | 402 |

EXAMPLE 8

Effect of Polyols on Glass Transition Temperature

In this example, a TA 2920 differential scanning calorimeter DSC (TA Instruments, New Castle, Del.) is used to measure the glass transition temperature of representative polymer compositions. Polymer samples are prepared by casting films at 105° C. The DSC instrument is calibrated with an indium standard. The sample size for DSC analysis is about 10-15 mg. The sample is heated at a heating rate of 10° C./min. The glass transition temperature of polymer is determined from the second scan using a half-height method.

To a certain extent, the usefulness of a particular polymer as an adhesive is dependent on its glass transition temperature. Therefore, changes in the glass transition temperature can be used to influence polymer performance on the Yankee dryer. As shown in Table 4, the addition of glycerol to Polymers A and B significantly altered their Tg's.

TABLE 4

Effect of glycerol on the glass transition temperature ($T_g$).

| Glycerol concentration (% of polymer actives) | $T_g$ (° C.) | |
|---|---|---|
| | Polymer A | Polymer B |
| 0 | 100 | 124 |
| 5 | 91 | — |
| 10 | 74 | 79 |
| 20 | 51 | 56 |
| 30 | 21 | 38 |

EXAMPLE 9

Effect of Crosslinkers

The effect on adhesion of reacting a representative polymer with crosslinkers is evaluated using the wet tack peel adhesion test described above. As shown in Table 5, adhesion is enhanced by reaction with PEGDGE-350, particularly in the pH range of 6.7-7.6.

TABLE 5

Improvement in adhesion by reacting representative polymers with a non-epichlorohydrin crosslinker, PEGDGE-350.

| Sample | Backbone | Crosslinker | % Crosslinker (based on polymer actives) | % Actives | pH | Peel-Force average (g/in) |
|---|---|---|---|---|---|---|
| Polymer A | Polymer A | none | 0 | 5 | 9.2 | 100 |
| 3A | | PEGDGE-350 | 1.0 | 5 | 8.8 | 139 |
| 3B | | | 1.3 | 5 | 9.0 | 140 |
| 3C | | | | 5 | 6.7 | 280 |
| 3D | | | | 5 | 7.6 | 195 |

EXAMPLE 10

Effect of Crosslinkers and Post Modifiers

The effect on adhesion of reacting representative polymers with crosslinkers and post-modifying the polymers by reaction with a halogenated organic acid is evaluated using the wet tack peel adhesion test described above. The results are shown in Table 6.

TABLE 6

Improvements in peel-force adhesion of representative polymers by reaction with crosslinkers and post modification with a halogenated organic acid.

| Sample | Backbone | Crosslinker (% of actives) | Post-modifier (% of actives) | % Actives | pH | Peel-Force average (g/in) |
|---|---|---|---|---|---|---|
| Polymer F | Polymer D | Epichlorohydrin | None | 15 | 7.0 | 479 |
| Polymer C | Polymer C | none | none | 13 | 8.0 | 110 |
| Polymer D | Polymer D | | | 15 | 9.5 | 0 |
| Polymer E | Polymer E | | | 10 | 6.0 | 190 |
| | | | | 21 | | 260 |
| 4A | Polymer D/ Polymer C, 9:1 (wt) | TMPTE (6.7) | none | 15 | 9.2 | 255 |
| 4B | | TMPTE (6.7) | none | 15 | 7.5 | 367 |
| 4C | | TMPTE (6.7) | ClCH$_2$CO$_2$H (10) | 15 | 7.2 | 773 |
| 5A | Polymer D/ Polymer C, 4:1 (wt) | TMPTE (5.9) | ClCH$_2$CO$_2$H (10) | 13.5 | 7.6 | 732 |
| 5B | | TMPTE (6.0) | ClCH$_2$CO$_2$H (10) | 15 | 7.5 | 738 |
| 5C | | TMPTE (6.0) | ClCH$_2$CO$_2$H (15) | 15 | 7.7 | 856 |
| 6A | Polymer D/ Polymer C, 4:1 (wt) | TMPTE (6.2) | none | 15 | 9.1 | 437 |
| 6B | | TMPTE (6.2) | ClCH$_2$CO$_2$Na (10) | 15 | 7.5 | 670 |
| 6C | | TMPTE (6.2) | ClCH$_2$CO$_2$H (10) | 15 | 7.5 | 740 |
| 7A | Polymer E/ Polymer C, 3:1 (wt) | TMPTE (5.5) | none | 12.7 | 7.8 | 629 |
| 7B | | TMPTE (5.5) | ClCH$_2$CO$_2$Na (10) | 12.7 | 6.7 | 414 |
| 7C | | TMPTE (5.5) | ClCH$_2$CO$_2$Na (5.0) | 12.7 | 7.1 | 494 |

As shown in Table 6, polymers, C, D and E, give lower adhesion than a reference commercial PAE type adhesive, Polymer F, which is made using an epichlorohydrin crosslinker. Reaction of these backbones or mixtures of backbones with crosslinkers and optional post-modification with chloroacetic acid or its sodium salt, produces materials that match or significantly exceed the adhesion of the reference, Polymer F.

Series 4 shows an improvement in adhesion after reacting two backbones, Polymer D and Polymer C at a ratio of 9:1 with TMPTE (Sample 4A) compared to the backbones themselves. Further improvements are made by adjusting the pH from 9.2 to 7.5 (Sample 4B), but the adhesion is still lower than the reference Polymer F. Much greater improvements are achieved after a post-treatment with chloroacetic acid (Sample 4C) resulting in a 60% higher adhesion than the reference Polymer F.

Series 5 shows similar results for a different ratio of the Polymer D to Polymer C, 4:1 (Samples 5A and 5B). It also demonstrates that a higher concentration of the post-modifier (chloroacetic acid) is beneficial for adhesion (Sample 5C).

Series 6 shows that a post-modification of Sample 6A, which is Polymer C/Polymer D reacted with TMPTE, using chloroacetic acid (Sample 6C) is preferable to using its sodium salt (Sample 6B)

Series 7 shows that reacting a Polymers E/Polymer C mixture with TMPTE produces a material (Sample 7A) having a greatly improved adhesion compared to the parent backbones and the reference product, Polymer F. A post-modification with sodium chloroacetate (Samples 7B and 7C) is, however, detrimental to adhesion.

EXAMPLE 11

Effect of Glycerol and Crosslinkers on Adhesion and Glass Transition Temperature The effect of crosslinkers and added glycerol on the glass transition temperature and adhesion of a representative polymer composition (Polymer 5A) is evaluated using the wet tack peel adhesion test and glass transition temperature tests described above. The results are shown in Table 7.

TABLE 7

Effect of glycerol and crosslinkers on adhesion and glass transition temperature.

| Glycerol concentration (% polymer actives) | Peel-force (g/in) | $T_g$ (° C.) |
|---|---|---|
| 0 | 732 | 58 |
| 6.7 | 859 | 48 |
| 13.3 | 919 | 34 |

TABLE 7-continued

Effect of glycerol and crosslinkers on adhesion and glass transition temperature.

| Glycerol concentration (% polymer actives) | Peel-force (g/in) | $T_g$ (° C.) |
|---|---|---|
| 26.7 | 796 | 15 |
| 53.3 | 696 | −8 |

As shown in Table 7, reaction with TMPTE has an additional benefit regarding the glass transition temperature ($T_g$). The $T_g$ of Sample 5A is significantly lower, 58° C., than that of the parent Polymer D backbone, 101° C. Addition of glycerol to 5A results in a further decrease in $T_g$. Peel-force adhesion is also affected by glycerol. An increase in adhesion peaked at a 13% glycerol level (actives based), resulting in a 25% increase in the peel-force. At higher glycerol levels, adhesion starts to decrease.

Changes can be made in the composition, operation, and arrangement of the method of the invention described herein without departing from the concept and scope of the invention as defined in the claims.

The invention claimed is:

1. A method of creping a paper web comprising:
    a) preparing an adhesive composition having a pH of about 7 to about 7.5 and comprising one or more vinylamine/N-vinyl formamide polymers composed of about 10 to about 99 mole percent vinylamine monomer and about 90 to about 1 mole percent N-vinyl formamide monomer;
    b) modifying the vinylamine/N-vinyl formamide polymers by reaction with a halogenated organic acid;
    c) after modifying the vinylamine/N-vinyl formamide polymers, applying the adhesive composition to a rotating creping cylinder d) pressing the paper web against the creping cylinder to effect adhesion of the paper web to the creping cylinder; and
    e) dislodging the paper web from the creping cylinder with a doctor blade;
    wherein the vinylamine/N-vinyl formamide polymers are reacted with a crosslinker before it is modified with the organic acid, and wherein the halogenated acid is chloroacetic acid in an amount of between about 10 weight percent to about 15 weight percent based on polymer actives.

2. The method of claim 1 wherein the polymers have a weight average molecular weight of about 100,000 to about 500,000 Daltons.

3. The method of claim 2 wherein the polymers are composed of about 20 to about 80 mole percent vinylamine monomer and about 80 to about 20 mole percent N-vinylformamide monomer.

4. The method of claim 3 wherein the polymer composition has a pH of about 7 to about 7.5.

5. The method of claim 4 wherein the polymers have a weight average molecular weight of about 300,000 to about 400,000 Daltons.

6. The method of claim 1 wherein the vinylamine/N-vinyl formamide polymers are reacted with about 1 to about 10 percent, based on polymer actives, of one or more crosslinkers wherein the crosslinkers contain at least one epoxide group and no halogens.

7. The method of claim 6 wherein the vinylamine/N-vinyl formamide polymers are composed of about 30 to about 99 mole percent vinylamine monomer and about 70 to about 1 mole percent N-vinylformamide monomer.

8. The method of claim 7 wherein the vinylamine/N-vinyl formamide polymers have a weight average molecular weight of about 10,000 to about 100,000 Daltons papermaking additive.

9. The method of claim 8 wherein the crosslinkers are selected from polyethyleneglycol diglycidyl ether and trimethylolpropane triglycidyl ether.

10. The method of claim 9 wherein the vinylamine/N-vinyl formamide polymers are composed of about 85 to about 95 mole percent vinylamine monomer and about 15 to about 5 mole percent N-vinylformamide monomer.

11. The method of claim 10 wherein the vinylamine/N-vinyl formamide polymers have a weight average molecular weight of about 30,000 to about 60,000 Daltons.

12. The method of claim 1 wherein the adhesive composition further comprises one or more water-soluble polyols.

13. The method of claim 12 wherein the water-soluble polyols are selected from glycerol, ethylene glycol, sorbitol, diethylene glycol, propylene glycol, polyethylene glycol and diethanolamine.

14. The method of claim 12 wherein the water-soluble polyol is glycerol.

15. The method of claim 1 wherein the vinylamine/N-vinyl formamide polymers are also reacted with about 1 to about 10 percent, based on polymer actives, of one or more additional crosslinkers wherein the additional crosslinkers contain at least one epoxide group one or more polymers selected from the group consisting of polyaminoamides, polyalkylenepolyamines, poly(vinyl alcohol/vinylacetate), polyethylenimines and polyvinylamine copolymers in a ratio of about 5/95 to about 95/5 by weight applied to said creping cylinder by a spray boom located proximate to said creping cylinder.

16. The method of claim 1 wherein the polymer modification by reaction with acid is accomplished by heating the polymer in the presence of acid at 80 degrees C. for 2 hours.

17. The method of claim 1 wherein the crosslinker is trimethylolpropane triglycidyl ether.

* * * * *